Figure 1:
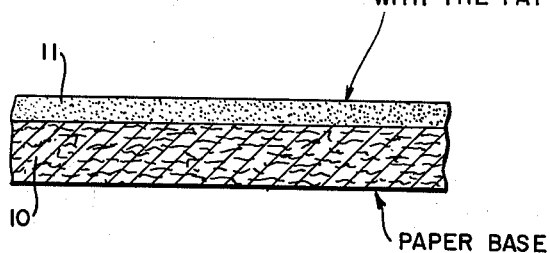

Feb. 23, 1965  M. S. BARBOUR  3,170,809
TRANSFER SHEET AND PROCESS OF MAKING
Filed May 4, 1962

TRANSFER COATING CONTAINING A HARD WAX, FATTY ACID AND A VOLATILE BASE REACTIVE WITH THE FATTY ACID

PAPER BASE

TRANSFER COATING CONTAINING A HARD WAX, FATTY ACID AND A VOLATILE BASE REACTIVE WITH THE FATTY ACID

RELEASE COATING

PAPER BASE

INVENTOR.
MARSHALL S. BARBOUR
BY *Clyde Metzger*

ATTORNEYS

3,170,809
TRANSFER SHEET AND PROCESS OF MAKING
Marshall S. Barbour, Livermore, Maine, assignor to
Oxford Paper Company, a corporation of Maine
Filed May 4, 1962, Ser. No. 192,327
5 Claims. (Cl. 117—36.4)

This invention relates to transfer sheets and the method of making same, and more particularly to transfer sheets prepared by coating a suitable base sheet with a coating composition comprising an aqueous emulsion of a hard wax and a volatile base, and thereafter hardening the coating on to the base sheet.

This application is a continuation-in-part of application Serial No. 134,156, filed August 28, 1961, now abandoned.

It is known from United States Patent No. 2,931,752 that transfer sheets can be prepared by coating a suitable base with a wax emulsion containing dispersing agents such as alkali metal soaps. These soaps are generally prepared by reacting a fatty acid with an alkali such as sodium or potassium hydroxide. Local pressure applied to these transfer sheets effects a transfer of the coating to an underlying sheet.

It has now been found that when a volatile base is employed instead of such non-volatile bases as sodium or potassium hydroxide in conjunction with a hand wax, the resulting transfer sheets are considerably superior to previously known transfer sheets, particularly with respect to the sharpness of outline of the relatively dry, nongreasy transferred coating and also with respect to the ease of transfer of the coating. Moreover, the use of a volatile base in these wax coatings enables better control of the hardness or brittleness and smudge resistance of the wax film.

Apparently, when a volatile base is employed in these coatings in place of potassium hydroxide, for example, the volatile base is driven off as the coating is dried, leaving the wax particles in such a physical state that, although the smudge resistance of the sheet is high, the wax particles are readily transferred in response to local pressure. The wax globules are in intimate contact with each other but are non-coalesced, and tend to remain on the surface of the sheet rather than penetrate the sheet. It is likely that the physical state of the coating is such that there is formed a fragile transfer layer of wax weakly adhered to the surface of the base but efficiently removable in the form of an image. The non-coalesced nature of the wax layer weakens the coherence within this layer so that the transferred image is strong and sharply defined.

A further advantage of the transfer sheets of this invention resides in the ability of these sheets to be deactivated by application of heat, usually by temperatures above about 190° F. for about 5–10 seconds. Coatings which are deactivated in such a manner are permanently set and capable of only a very faint transfer. Moreover, they are highly resistant to smudging.

Broadly, the transfer sheets of this invention are prepared by forming an aqueous dispersion, or emulsion, of a hard wax in admixture with a fatty acid and a volatile base, coating the emulsion to a suitable base, and drying the coating. Suitable coloring matter, such as a dye or pigment, can advantageously be incorporated into the dispersion. Additives such as additional dispersing agents, solvents, or non-film forming thermoplastic resins can also be incorporated in the dispersion.

The volatile bases which can be used according to this invention are capable of being reacted with a fatty acid under emulsion forming conditions to form a fatty acid soap suitable as a dispersing or emulsifying agent. Amine soaps made from volatile bases are examples of emulsifying agents which can be advantageously employed. Ammonia, morpholine, N-methyl morpholine, 2,6-dimethyl morpholine, N-ethyl morpholine, N,N-dimethyl ethanolamine, N,N-diethyl ethanolamine, 2-amino-2-methyl-1-propanol, N,N-dimethyl isopropanolamine, and the like are some examples of volatile bases which can be used.

The fatty acids which can be used are those which are generally used in the art to prepare emulsifying agents for waxes and these can be readily determined by one skilled in the art. Examples of such fatty acids are oleic, palmitic, stearic, linoleic acids, and the like. Preferably, all or part of the fatty acid is blended with the melted wax and the blend is then added to a hot solution containing water, a volatile base, and any remaining portion of fatty acid.

In forming the wax emulsion of this invention, a hard wax is employed. The term "hard wax," as used herein, defines a class of waxes which is characterized by a particular degree of hardnes as determined by the so-called Penetration Test. The Penetration Test measures the depth to which a weighted needle penetrates a sample of wax. The wax sample is melted by heating it to about 30° F. above its melting point and then cooled to 770 F. The hardness of the wax is measured with a penetrometer whereby a standard needle, under a load of 100 grams, is applied to the wax sample for 5 seconds. The depth to which the needle penetrates the wax during the 5 seconds time interval is measured in tenths of a millimeter. If the needle penetrates the wax to a depth of 0.2 millimeter, the hardness rating of the wax is 2. If the needle penetrates the wax to a depth of 0.8 millimeter, the rating is 8, and so forth. The hard waxes which can be used according to this invention are those which have a rating from 0 to about 6, and include such waxes as montan, Duroxon (a trademark for a light colored oxidized type of synthetic Fischer-Tropsch hydrocarbon wax, manufactured by Krupp Kohlenchemie G.m.b.H., Germany), carnauba, and the like. The wax may be a petroleum, vegetable, synthetic or a mineral wax or a combination of waxes so long as the wax is stable, emulsifiable, and has the required degree of hardness and so long as its physical properties are not adversely altered when the emulsion is dried.

Various coloring agents such as organic or inorganic pigments are advantageously incorporated in the wax emulsions, such as, for example, phthalocyanine pigments (organic pigments which have a structural unit of 4 isoindole groups, $(C_6H_4)C_2N$, linked by 4 nitrogen atoms to form a conjugated chain), carbon black, such as Aquablak (a carbon black and a bone black aqueous dispersion marketed by Columbia Carbon Company), Calcotones (highly dispersed pigment pastes manufactured by American Cyanamid Company), etc. The amount of pigment employed wll depend upon the type of pigment being used, the color desired, etc. Three parts of a 35% dispersion of carbon black, for example, can advantageously be used along with 29.6 parts of a 20% wax emulsion. Considerably higher or lower amounts of pigment can also be used.

The ability of the transfer coating to become deactivated by application of heat to the coating is enhanced by incorporating into the wax emulsion a small amount of a non-film-forming thermoplastic resin. The term "non-film-forming resins" as used herein refers to resins which will not form films at the temperatures used to apply and dry the coating. The amount of non-film-forming resin which can be used depends upon the particular resin used and upon the various other ingredients of the wax emulsion. Various non-film-forming resins have been employed in amounts up to about 10% by weight and above, based on the amount of the wax plus fatty acid. Acrylic polymers (manufactured by Rohm & Haas under the trade name Rhoplex), vinyl chloride-vinylidine chloride copolymers, and polystyrene polymers are examples of non-film-forming resins which can be incorporated in the wax emulsions. Transfer coatings which are made from such resin containing emulsions and which have been heated to, example, 360° F. for 5 seconds were found to be substantially deactivated and smudge proof.

In forming the coating composition of this invention, the proportion of the various ingredients is not particularly critical. The most suitable amount of each ingredient which can be used can readily be determined by one skilled in the art. For example, the amount of volatile base used is advantageously only as much as is needed to react with the fatty acid, such as an amount chemically equivalent to that of the fatty acid. Higher amounts could be used however. Advantageously, about 5% by weight of the fatty acid, based on the wax, is used. This amount of fatty acid could probably be within the range of from about 3 to 10% or even beyond this range. The combined weight of the wax and the fatty acid in the aqueous wax emulsion is advantageously around 20% by weight based on the total weight of the emulsion. Of course, a higher or lower proportion of the wax-fatty acid component may be employed depending upon the various ingredients used in the emulsion, etc.

The wax emulsions of this invention are prepared by standard emulsifying techniques. Advantageously, part or all of the fatty acid is blended with the melted wax and the blend is then added to a hot solution containing water and a volatile base and the ingredients vigorously agitated. Other additives can then be added and thoroughly admixed. The emulsion is then applied to a suitable base and dried preferably at a temperature below the fusion temperature of the wax.

The base sheet which is coated with the wax emulsion described above can be either a coated or uncoated paper, a thin plastic film such as cellophane, or a thin film of polyethylene terephthalate such as manufactured by Du Pont under the trade name Mylar or any other suitable supporting medium. The transfer properties of the transfer coatings of this invention can be improved by applying a suitable release coating to the base sheet prior to the application of the transfer coating. Examples of release coatings which can be used include colloidal silica such as that marketed by Monsanto under the trade name Syton, magnesium aluminum silicate, hydroxyethyl cellulose, sodium stearate, attapulgite clay, acetylated starch, hydrated alumina, sodium silicate and so forth.

The release coatings are particularly helpful where the receiving base or paper does not have particularly high receptive properties for the transfer coating.

The invention includes the use of a receptor paper for receiving the transferable image from the transfer coating. The receptor paper is described in my copending application Serial No. 79,980, filed January 3, 1961, now U.S. Patent No. 3,118,782, and assigned to the same assignee as this application. Such a receptor paper comprises a base sheet on which is coated a dispersion of calcium carbonate having a relative sedimentation volume of between about 2 and 6 in admixture with an adhesive and in which the pigment-adhesive ratio is between about 7:1 and 2:1. Significantly improved transfer properties are obtained by using such a receptor sheet in conjunction with the transfer coating of this application whether a release coating is used under the transfer coating or not.

A particular embodiment of the invention involves coating one surface of the base sheet with the calcium carbonate coating composition described in application Serial No. 79,980 and then coating the other surface with the wax emulsion transfer coating described above. The calcium carbonate coating acts as a receptor coating for the transfer coating. Thus two sheets can be placed together so that the transfer coating of one sheet is in contact with the receptor coating of the other sheet so that when local pressure is applied to the transfer coating, an intensely clear image is transferred to the receptor coating at the point at which the pressure was applied.

FIG. 1 shows a paper base 10 having a transfer coating 11 prepared according to the present invention adhered to the paper base.

Figure 2:
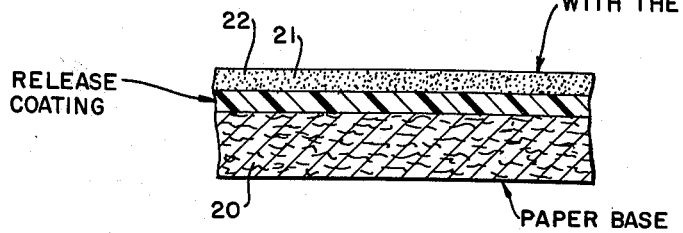

FIG. 2 shows a paper base 20 with a release coating 21 adhered thereto and the transfer coating 22 prepared according to this invention adhered to the release coating.

The following examples show the manner in which the transfer sheets and the coating compositions employed in this invention can be made. These examples are given by way of illustrating and are not intended in any way to limit the scope of the invention. Parts are by weight.

*Example I*

A wax emulsion coating composition was prepared as follows: 32.0 parts of montan wax and 1.5 parts of oleic acid were heated to a melt and blended together. This blend was then added, at a temperature of 220–230° F., with stirring, to a solution (at 200° F.) of 130 parts water and 4.62 parts morpholine. To 29.6 parts of the wax emulsion thus formed was added 3.0 parts Aquablak, 5 parts water, and 0.05 Pluronic L–62 (a nonionic surface active agent prepared by the addition of ethylene oxide to polypropylene glycol and manufactured by Wyandotte Chemicals Corp.). The ingredients were thoroughly mixed together, coated on paper base and dried.

*Example II*

A transfer sheet having a Mylar base was prepared as follows: 50 parts of Duroxon J–324 wax and 1.87 parts of oleic acid were heated to a melt and blended. This blend was then added, at a temperature of 220–230° F., with stirring, to a solution (at 200° F.) of 127 parts water, 0.80 part aqua ammonia, and 0.63 part oleic acid. The emulsion was stirred a few minutes and then cooled rapidly to below 150° F. To 18.80 parts of the wax emulsion thus formed was added 1.05 parts of a carbon black in the form of a dispersion. The ingredients were then thoroughly mixed, cooled, and coated on a sheet of Mylar, and dried.

*Example III*

A wax emulsion coating composition was prepared as follows: 32 parts of Duroxon J–324 and 6 parts of oleic acid were heated to a melt and blended. This blend was then added, at a temperature of 220–230° F., with stirring, to a solution (at 210° F.) of 24.1 parts ammonium oleate solution (containing 1.34 parts $NH_3$ and 3.05 parts oleic acid) and 150 parts water. The ingredients were vigorously agitated and the resulting emulsion cooled. The emulsion was then applied to a paper raw stock base and dried.

*Example IV*

A wax emulsion coating composition was prepared as follows: 32 parts of Duroxon J–324 and 8 parts toluene were heated to a melt and blended. This blend was then added, at a temperature of 220–230° F., with stirring, to a solution (at 210° F.) of 12.0 parts ammonium oleate solution and 140 parts water. The ingredients were vigorously agitated and the resulting emulsion cooled. The emulsion was then applied to a paper raw stock base and dried.

*Example V*

A wax emulsion coating composition was prepared as follows: 20.0 parts of Duroxon J–324 and 0.75 part of oleic acid were heated to a melt and blended. This blend was then added, at a temperature of 220–230° F., with stirring, to a solution (at 210° F.) of 84 parts water, 0.25 part oleic acid, 0.30 part of 28% ammonia. The ingredients were vigorously agitated and the resulting emulsion cooled. The emulsion was then applied to a paper raw stock base and dried.

Example VI

A coating composition was prepared as follows: 10.0 parts of a 2% phthalocyanine blue dispersion was thoroughly admixed with 27.0 parts of a wax emulsion such as prepared according to Examples III–V. The emulsion was cooled, applied to a paper base and dried.

Example VII

A coating composition was prepared as follows: 0.1 part of Pluronic L-62, 1.2 parts of Calcotone Scarlet YP, and 5.0 parts of Calcotone Orange R was thoroughly admixed with 22.6 parts of a wax emulsion such as prepared according to Examples III–V. The emulsion was cooled, applied to a paper base and dried.

Example VIII

Transfer sheets prepared from coating compositions containing a non-film-forming resin were prepared as follows: 1 part Aquablak B, 2 parts water, 0.05 part Pluronic L-62 and 1.4 parts vinyl chloride-vinylidine chloride copolymer were admixed with 27.5 parts of a wax emulsion such as prepared according to Examples III–V. The emulsion thus formed was applied to a paper base and dried. When the resulting transfer sheet was heated at 360° F. for 20 seconds, the sheet became deactivated and substantially non-transferable.

Example IX

Transfer sheets prepared from a coating composition containing a non-film-forming resin were prepared as follows: 0.77 part of carbon black and 0.4 part of polystyrene polymer was admixed with 20 parts of a wax emulsion such as prepared according to Examples III–V. The emulsion thus formed was applied to a paper base. When the resulting transfer sheet was heated at 360° F. for 5–10 seconds, the sheet became deactivated and substantially non-transferable. Additional transfer sheets were made according to the above procedure using a polyacrylate in place of the polystyrene polymer. The resulting transfer sheets became considerably deactivated after application of heat of 360° F. for 5 seconds. All of the transfer sheets prepared in accordance with the Examples of I–IX were tested by placing the transfer coating in contact with a sheet of paper and pressure applied by means of a stylus to the backside of the paper having the transfer coating adhered thereto. The coating transferred readily in areas co-extensive with the pressure. All of the transfer sheets prepared as set forth in Examples I–IX were also tested using a receptor paper as defined in copending application Serial No. 79,980 referred to above and in each instance, the transfer of the image was considerably improved.

I claim:

1. The method of preparing a transfer sheet which comprises coating a suitable base sheet with a coating composition comprising an aqueous emulsion of a hard wax, a fatty acid, and a volatile base which is reactive with the fatty acid, and thereafter drying the coating on to the base sheet.

2. The method of claim 1 in which coloring matter is incorporated into the wax emulsion.

3. The method of claim 2 in which the coloring matter is carbon black.

4. Transfer sheets prepared according to the method of claim 2.

5. The method of preparing a transfer sheet which comprises coating a suitable paper base sheet with a release coating and coating on top of the release coating a composition comprising an aqueous emulsion of a hard wax, a fatty acid, and a volatile base which is reactive with the fatty acid, and thereafter drying the coating.

References Cited in the file of this patent
UNITED STATES PATENTS

| | | |
|---|---|---|
| 1,209,222 | Statham | Dec. 19, 1916 |
| 1,266,956 | Kniffler | May 21, 1918 |
| 1,328,188 | Ohashi | Jan. 13, 1920 |
| 1,374,112 | Rafsky | Apr. 5, 1921 |
| 1,954,451 | Lawrence | Apr. 10, 1934 |
| 2,035,768 | Sherman et al. | Mar. 31, 1936 |
| 2,351,683 | Hughes et al. | June 20, 1944 |
| 2,395,992 | Clark | Mar. 5, 1946 |
| 2,931,752 | Newman | Apr. 5, 1960 |

UNITED STATES PATENT OFFICE
CERTIFICATE OF CORRECTION

Patent No. 3,170,809                          February 23, 1965

Marshall S. Barbour

It is hereby certified that error appears in the above numbered patent requiring correction and that the said Letters Patent should read as corrected below.

Column 1, line 27, for "hand" read -- hard --; column 2, line 19, for "hardnes" read -- hardness --; line 23, for 770 F." read -- 77° F. --; same column 2, line 37, for "Germany" read -- West Germany --; column 3, line 5, before "ex-" insert -- for --; line 31, before "other" insert -- agitated. Coloring matter, non-film-forming resins, or --; column 4, line 12, for "illustrating" read -- illustration --.

Signed and sealed this 20th day of July 1965.

(SEAL)
Attest:

ERNEST W. SWIDER                          EDWARD J. BRENNER
Attesting Officer                             Commissioner of Patents